United States Patent
Klüver

(10) Patent No.: US 9,784,869 B2
(45) Date of Patent: Oct. 10, 2017

(54) NOISE MODELS BY SELECTION OF TRANSFORM COEFFICIENTS

(71) Applicant: PGS Geophysical AS, Lysaker (NO)

(72) Inventor: Tilman Klüver, Sande (NO)

(73) Assignee: PGS Geophysical AS, Oslo (NO)

( * ) Notice: Subject to any disclaimer, the term of this patent is extended or adjusted under 35 U.S.C. 154(b) by 639 days.

(21) Appl. No.: 14/074,315

(22) Filed: Nov. 7, 2013

(65) Prior Publication Data
US 2014/0340987 A1 Nov. 20, 2014

Related U.S. Application Data

(60) Provisional application No. 61/823,884, filed on May 15, 2013.

(51) Int. Cl.
*G01V 1/36* (2006.01)
*G01V 1/32* (2006.01)
*G01V 1/38* (2006.01)

(52) U.S. Cl.
CPC .............. *G01V 1/364* (2013.01); *G01V 1/32* (2013.01); *G01V 1/38* (2013.01); *G01V 2210/25* (2013.01); *G01V 2210/3248* (2013.01)

(58) Field of Classification Search
CPC . G01V 1/364; G01V 1/32; G01V 1/38; G01V 2210/25
USPC ......................................................... 367/21
See application file for complete search history.

(56) References Cited

U.S. PATENT DOCUMENTS

| | | | |
|---|---|---|---|
| 5,754,492 A | 5/1998 | Starr | |
| 5,774,416 A | 6/1998 | Sadek et al. | |
| 5,825,716 A | 10/1998 | Starr | |
| 6,654,693 B2 | 11/2003 | Sen et al. | |
| 7,286,690 B2 | 10/2007 | Kelly | |
| 7,359,283 B2* | 4/2008 | Vaage | G01V 1/3808 367/15 |
| 7,450,467 B2 | 11/2008 | Tveide et al. | |
| 7,675,812 B2 | 3/2010 | Ferris | |
| 7,929,373 B2 | 4/2011 | Barr, Jr. | |
| 8,089,825 B2 | 1/2012 | Barr, Jr. et al. | |
| 8,427,901 B2 | 4/2013 | Lunde et al. | |
| 2008/0089174 A1* | 4/2008 | Sollner | G01V 1/3808 367/21 |
| 2008/0221801 A1* | 9/2008 | Craft | G01V 1/364 702/17 |
| 2010/0027375 A1 | 2/2010 | Barr, Jr. | |
| 2014/0200818 A1* | 7/2014 | Peng | G01V 1/364 702/17 |

* cited by examiner

*Primary Examiner* — James Hulka
*Assistant Examiner* — John T Nolan

(57) ABSTRACT

A data set representing features of a geologic formation is formed from two or more signal acquisition data set representing independent aspects of the same wavefield. A wavelet transform is performed on the two or more signal acquisition data sets, and the data sets are further transformed to equalize signal portions of the data sets. Remaining differences in the data sets are interpreted as excess noise and are removed by different methods to improve the signal-to-noise ratio of any resulting data set.

29 Claims, 2 Drawing Sheets

NOISE MODELS BY SELECTION OF TRANSFORM COEFFICIENTS

CROSS-REFERENCE TO RELATED APPLICATIONS

This application claims priority to U.S. Provisional Patent Application Ser. No. 61/823,884, filed May 15, 2013, which is incorporated herein by reference.

BACKGROUND

In geophysical data acquisition, measurements may be taken of wavefields that have been initiated by geophysical energy sources, for example air guns, marine vibrators, electric bipole antennae, and magnetic coils. The geophysical energy sources may be positioned at known locations in a geographic area. In a marine setting, the sources may be towed behind one or more boats traveling a prescribed course, usually along a group of generally equidistant parallel lines. The geophysical sources are caused to emit energy. For example, when the geophysical source is a seismic source, sonic pulses are emitted, and sensors record reflected sonic waves as voltages from transducers. The data received may be compiled into a data set with time and distance along and across the sampling paths. Such data is commonly used to more effectively prospect for geologic resources such as oil and gas deposits.

The data set obtained typically contains information of interest indicating the geology of earth strata below the geophysical equipment. Unfortunately, however, the geophysical information is often obscured by substantial noise from a wide variety of sources. Coherent noise sources, such as hydrostatic pressure variations, cavitation of boat propellers, and seismic interference, are usually well-defined and easily removed. Incoherent noise sources, however, such as tugging noise caused by sudden movements of a vessel or sensor due to wave motion, strumming or vibration of cables, and swell noise, are more difficult to remove.

Conventional methods of removing incoherent noise from geophysical data typically employ various rigorous denoising procedures. These procedures typically involve cascaded applications of various de-spiking and de-noising techniques. A user is often required to iteratively process the data, testing parameters and performing quality control. Such procedures are expensive, time-consuming, and imprecise. If the parameterization is too conservative, noise remains in the data. If the parameterization is too aggressive, geophysical information may be affected. Thus, there is a continuing need for new methods of removing noise from geophysical data.

BRIEF DESCRIPTION OF THE DRAWINGS

So that the manner in which the above-recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

To resolve signal from noise in a given wavefield, the wavefield may be measured using two or more different sensors to form a plurality of records or data sets representing the wavefield. The sensors may be the same kind of sensor or different kinds of sensors. The sensors may be co-located with respect to the wavefield, or the sensors may be displaced in time or space with respect to the wavefield.

Figure 1:
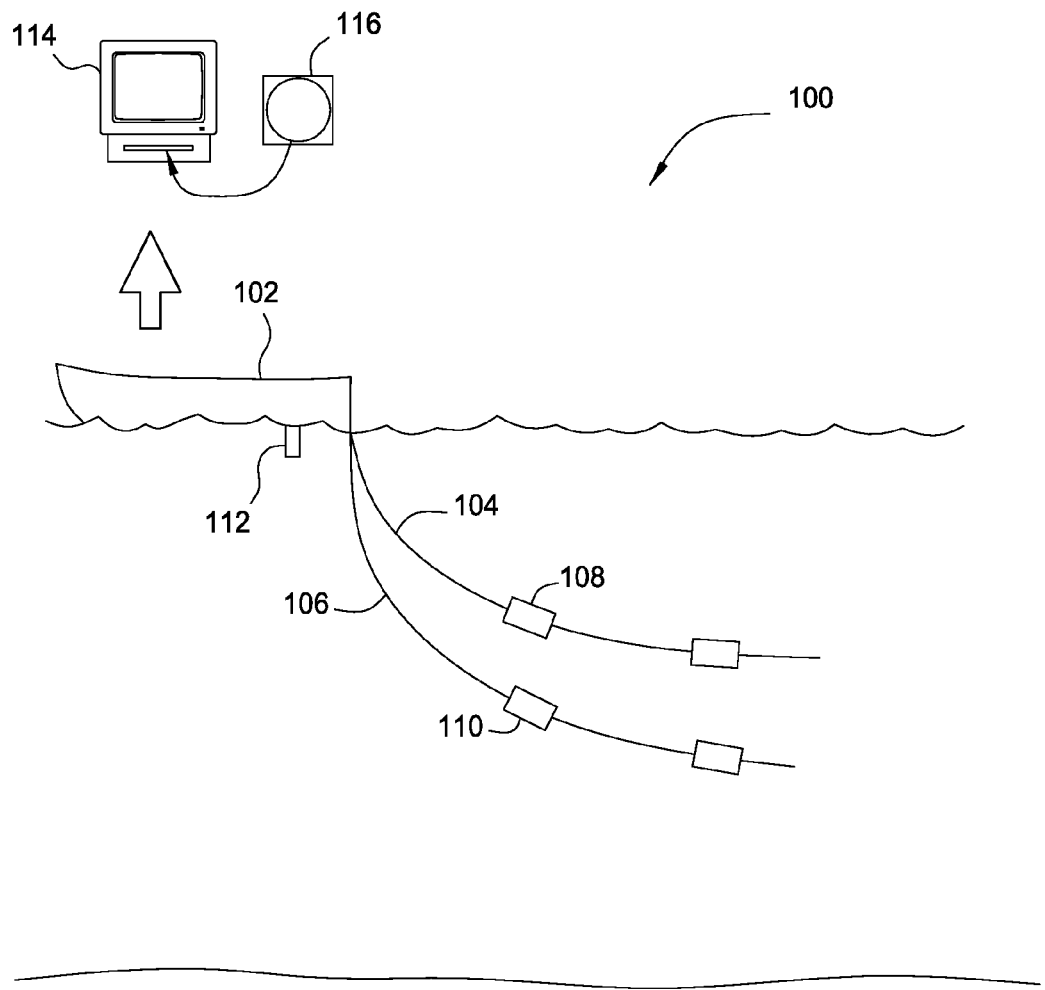
FIG. 1 is an activity diagram showing a data acquisition scheme.

FIG. 1 is an activity diagram showing a data acquisition scheme 100 in a marine context. A vessel 102 tows a first streamer 104 and a second streamer 106 in the water behind the vessel. The first streamer 104 has a first sensor 108, and the second streamer 106 has a second sensor 110. In a typical marine data acquisition situation, a vessel may have any suitable number of streamers, each with multiple sensors. An energy source 112, which may be attached to the vessel 102 or displaced from the vessel 102 by any suitable extension, or attached to or displaced from another vessel (not shown), emits energy. In the marine context, the energy may propagate through the water and may reflect and/or refract from the various surfaces of water and geologic features. The sensors 108/110 may detect the resultant wavefield.

The sensors 108/110 may have a fixed relationship with respect to each other that may be accounted for mathematically. The sensors 108/110 may also measure different aspects of the wavefield that may be related mathematically. For example, a geophone and a hydrophone typically measure particle velocity and pressure respectively, which may be related mathematically. Any number of streamers may be used, and multiple vessels may be used. Streamers may have any number of sensors, which may be the same or different types. Commonly used sensors in a marine gather include geophones, hydrophones, and accelerometers. Since each streamer may exhibit a different depth profile, the sensors on any particular streamer may be at a different or the same depths, and sensors on different streamers may likewise be at different or the same depths.

The physical data collected from the sensors 108/110, depicting real-world signals and vibrations from the physical environment, forms a primary record of the wavefield that may be represented and stored in a computer 114 or on a computer readable medium 116 that may be inserted into the computer 114 for storing the data. The computer readable medium 116, which is not a transitory signal medium, may contain the raw data collected from the sensors 108/110, or a data product made by processing the raw data according to methods described herein. More than one data product, each data product formed by performing a different process on the raw data, may be stored on the computer readable medium 116. The computer readable medium 116 may contain instructions for performing methods described herein, in addition to, or instead of, the raw data or the data product. The physical data may additionally be transformed by certain methods described below and implemented in the computer 114, which may also be stored on the computer readable medium 116 as instructions for performing any of the methods described below. Computer readable media that may store various embodiments include rotationally operated magnetoresistive memory devices such as floppy disks, hard disks, stationary magnetoresistive memory devices such as flash drives, and optical disks. Additionally, data products and instructions for computer execution of methods described herein may be transmitted by wire or wirelessly.

The primary record from each sensor has a signal part s and a noise part n, so that the wavefield w may be expressed as $$w = s + n \quad (1).$$

Two sensors measuring the same wavefield measure the same signal part s, with different levels of incoherent noise n. Once coherent noise has been removed, the signal part of the primary record from each sensor may be mathematically transformed, if necessary, to be equal by accounting for time and space displacements and differences in the aspects of the wavefield that are detected, such as pressure and particle velocity. Any residual difference in the primary record from two sensors that have been equalized is thought to be due to noise in the primary record. Such transformation may be performed on the physical data set derived directly from the physical environment (i.e., the primary record), or on a data set that has been transformed in any analytical way, such as by an integral transform.

Figure 2:
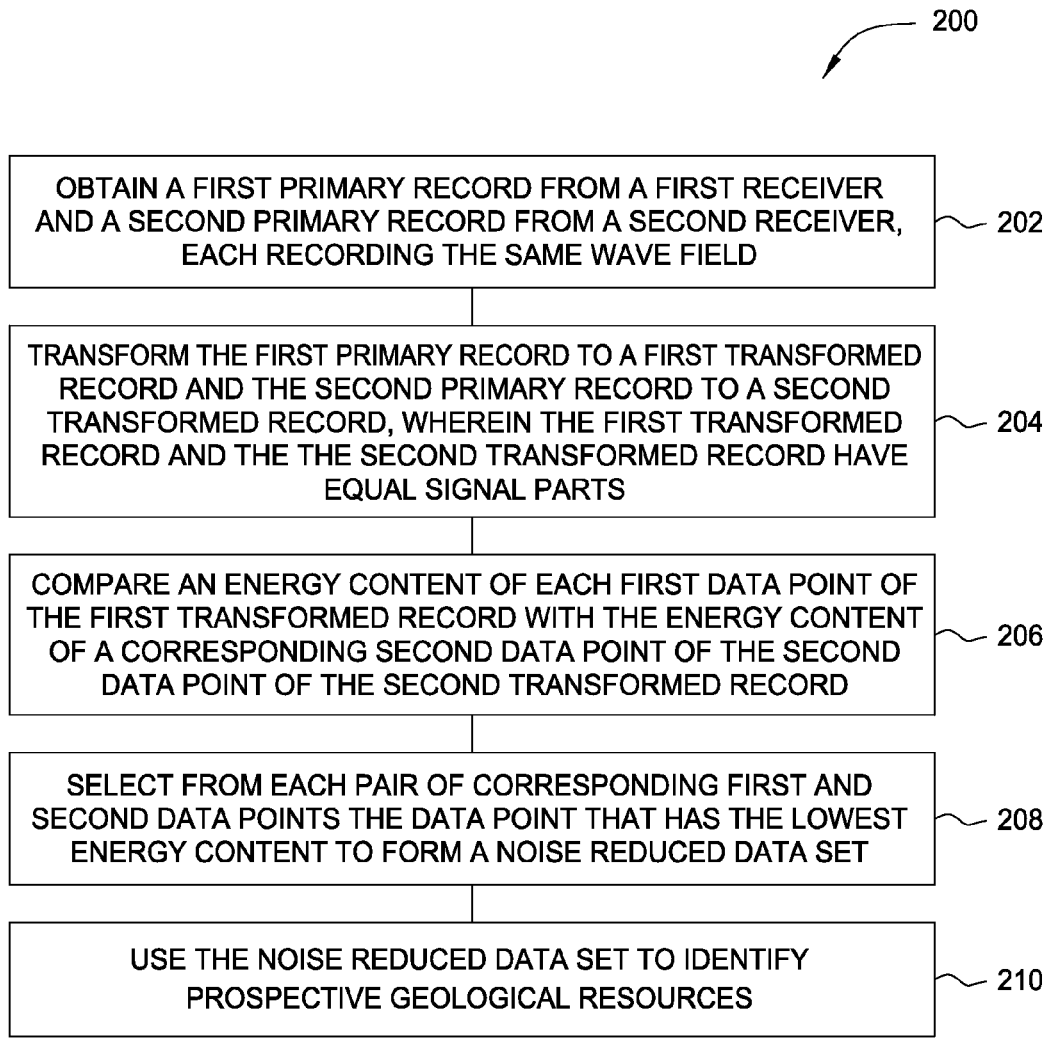
FIG. 2 is a flow diagram summarizing a method according to one embodiment.

FIG. 2 is a flow diagram of a method 200 for removing noise from a data set. Due to the substantial amounts of data processed in a typical geophysical application, the method 200 is implemented using a computer system programmed to perform the method 200. At 202, a first primary record and a second primary record are obtained recording or representing aspects of the same wavefield. The first primary record and the second primary record may be obtained in a data acquisition similar to that described above in connection to FIG. 1. A primary record generally represents geophysical data obtained by projecting energy, which may be pressure energy, seismic energy, acoustic energy, electromagnetic energy, or any other suitable energy, into the earth and recording the effect of the water and geologic features on that energy. The recorded wavefield may indicate boundaries between different materials in the earth, and may be used to prospect for subterranean resources, such as oil, gas, and minerals, for recovery.

Each primary record is typically indexed according to one or more indices. Relating to geophysical data, the indices are typically one or more spatial directions and time. The spatial directions relate to distance along a sampling path and distance from the line of the sampling path, and time relates to the elapsed time at which each energy amplitude is detected. Each primary record represents energy waves resulting from designed energy perturbations produced by an energy emitter. An example of such an emitter, commonly used as an energy source in geophysical data gathers, is an air gun or a marine vibrator, or a signal generator.

At 204, the first primary record and the second primary record are transformed such that the first transformed record and the second transformed record have substantially equal signal parts. The first primary record and the second primary record may also be transformed to a frequency domain using an integral transform that employs a frequency parameter. The integral transform is an operation of the form:

$$X^T = T(X) = \int_v X f(v) dv \quad (2)$$

where f(v) is the kernel of the integral transform, and boldface generally denotes a mathematical object that may have non-zero rank, such as a vector. As such, the integral transform may be a multi-dimensional transform. The domain v of the kernel f(v) typically includes the domain of the raw data set X and at least one transform index, each transform index corresponding to an index of the raw data set X. Thus, defining $v = u \cup \alpha$, we may express some integral transforms as $$X^T(\alpha) = T(X(u)) = \int_u X(u) f(u, \alpha) du \quad (3)$$

The transform may be performed with respect only to a time parameter, such that the primary records are transformed to a frequency domain, or the transform may be performed to distance and time parameters, such that the primary records are transformed to a frequency-wavenumber domain.

One type of integral transform commonly used is the wavelet transform. The wavelet transform may be used to define an array of coefficients that may be used to represent a data set as a wavelet series. So, the wavefield data set may be represented as follows:

$$w(u) = w(x_1, x_2, x_3, t) = \Sigma_{jk} c_{jk}(x_1, x_2, x_3) \psi_{jk}(x_1, x_2, x_3, t) \quad (4)$$

where $\psi$ may be a wavelet function such as the Haar function, the Meyer function, the Morlet function, the Daubechies function, the Coifman function, the Shannon function, the Lemarie function, and other wavelet functions. The coefficients may be derived from the wavelet transform as follows:

$$c_{jk}(x) = \frac{1}{\sqrt{|2^{-j}|}} \int_t \psi(2^j t - k) w(u) dt \quad (5)$$

Here, the domain u of the wavefield may be two or three spatial dimensions and time, and the domain x of the coefficient array $c_{jk}$ is the domain u excluding time, the effect of time on the coefficients being integrated and parameterized in the coefficients by the subscripts j and k. The wavelet transform above applies to one variable of the data set (time), but the method may be extended to any or all variables of the data set, if desired. Thus, the wavelet coefficients with respect to variable $x_i$ of the domain $\sigma$ of the data set $w(\sigma)$ are as follows:

$$c_{jki}(\sigma_{-i}) = \frac{1}{\sqrt{|2^{-j}|}} \int_{\sigma_i} \psi(2^j \sigma_i - k) w(\sigma) d\sigma_i \quad (6)$$

where $\sigma_{-i}$ denotes the domain $\sigma$ reduced by the variable $\sigma_i$ such that the variable $\sigma_i$ is parameterized by the subscripts j and k.

It should be noted here that use of a wavelet transform is a way of obtaining time resolution in the frequency domain, and the methods described herein may be used with any other way of obtaining such resolution. Such processes include using the Gabor transform or using a windowed Fourier transform.

The transformation of 204 may account for sensor displacement in time and/or space and to account for measurement of different aspects of the wavefield. As noted above, the transformation generally results in a signal portion of each primary record being equalized. Where a hydrophone and a geophone are used in a marine context to record the same wavefield, the pressure wavefield from the hydrophone can be converted to an equivalence with the velocity wavefield using the following relation:

$$v_z = -\frac{k_z}{\omega \rho} \left( \frac{1 + e^{-2ik_z z R}}{1 - e^{-2ik_z z R}} \right) p \quad (7)$$

where $k_z$ is vertical wavenumber, $\omega$ is frequency, $\rho$ is density, and $z^R$ is receiver depth. Applying the relation above results in a wavefield recorded by a hydrophone, or any other pressure sensor, and a wavefield recorded by a corresponding geophone, or any other particle velocity sensor, having the same signal part s.

The transformation of equation 7 may be performed in any convenient domain by transforming the above equation to the desired domain, along with the data to be equalized. If an integral transform applied at 204 is applied before an equalizing transform, for example to render the physical data in a wavelet domain, then the integral transform, for example the wavelet transform, may be applied to, or convolved with, the transform of equation 7, and then the data are filtered using the resulting relation. Conversely, the data may be equalized in the physical domain before applying an integral transform.

After applying the transformation 204, frequency notches in the data may be eliminated by applying data from the first sensor to the data from the second sensor, and vice versa, if the sensors are selected and positioned to create data sets with frequency notches at different frequencies, for example by locating the sensors at different depths. Any of the transformations described above in connection with 204 may be performed by a computer with a computer-readable medium having instructions to perform such transformations.

In general, two data sets A and B, representing a single wavefield may be gathered by measuring different aspects of the wavefield, such as pressure, particle velocity, and particle acceleration. For example, data set A may reflect pressure while data set B reflects particle velocity. The data sets A and B may also measure the same aspect of the wavefield, but from different locations in the coordinate space. Generally, A and B are gathered in a way that A and B may be related by a known transformation $F_A$, applicable to data set A, and $F_B$, applicable to data set B, such that if A and B each have a signal part and a noise part, $$A = A_S + A_N \qquad (8)$$

$$B = B_S + B_N \qquad (9)$$

the signal parts are related as $$F_A A_S = F_B B_S \qquad (10)$$

The transformation may be applied in the space-time domain or in the frequency or frequency-wavenumber domain to form equalized data sets. In general, an equalizing transformation may be applied in any convenient domain by transforming or convolving the equalizing transformation with the selected domain transformation, or with no other transformation if the equalizing transformation is applied in the native domain of the original data sets. Using such transformations, A and B can be regarded as representing the same signal interchangeably.

After transformation in this way, the following result is obtained:

$$F_A A - F_B B = F_A A_S - F_B B_S + F_A A_N - F_B B_N = F_A A_N - F_B B_N \qquad (11)$$

In other words, any remaining difference between the two data sets is attributable to noise in one of the two data sets. If $F_A A < F_B B$, then A may be used rather than B, or B may be replaced by $F_A A / F_B$ to lower the overall noise of the two data sets. The converse may be applied if $F_A A > F_B B$. The data sets $F_A A$ and $F_B B$ may be equalized records formed by applying the transformations $F_A$ and $F_B$ as filters to the primary records from two sensors, or to the wavelet transforms of the primary records.

A selection process is performed to remove noise from the primary records representing the wavefield, resulting in a noise reduced data set. In the general case of the data sets A and B, for a first equalized record $F_A A$ and a second equalized record $F_B B$ having the same signal portion s, energy content of corresponding data points is compared at 206, and the data point that has the lowest energy content may be selected at 208.

In another aspect, a third data set may be formed by linear combination, as follows:

$$C = L\min(A, F_B B / F_A) + M\min(B, F_A A / F_B) \qquad (12)$$

where L and M are any convenient scaling or filtering factors. If an equal weighting of the two data sets is desired, L and M may be equal. L and M may also be determined by finding the values of L and M that minimize the residual energy in each data point. In this way, the signal to noise ratio of the resulting data set C is improved.

Each data value q from a first equalized record $F_A A$ may be compared to a corresponding data value r from a second equalized record $F_B B$. Corresponding data values q and r from the equalized records $F_A A$ and $F_B B$ are data values from the same domain location x in each of the equalized records $F_A A$ and $F_B B$. If the energy content of q is less than that of r, then r may be replaced with q in the second equalized record $F_B B$, and if the energy content of r is less than that of q, then q may be replaced with r in the first equalized record $F_A A$. Alternately, a third data set may be populated with the minimum energy combination of q and r at each location in the domain.

Wavelet coefficients may be used as input for the selection at 208. Performing a wavelet transformation of the data set A yields a set of wavelet coefficients $c_A(x)$, and transformation of the data set B yields the wavelet coefficients $c_B(x)$. A selection is made based on a determination of the energy content encoded in each wavelet coefficient $c_A(x)$ and $c_B(x)$. In one aspect, this may be done by computing the Hilbert transform of each data set A and B and then computing the wavelet transform of the Hilbert transforms to yield wavelet coefficient sets $c_A^H(x)$ and $c_B^H(x)$. An envelope of each wavelet coefficient $c_A(x)$ and $c_B(x)$ can then be computed, as follows:

$$E_A(x) = \sqrt{c_A(x)^2 + c_A^H(x)^2} \qquad (13)$$

$$E_B(x) = \sqrt{c_B(x)^2 + c_B^H(x)^2} \qquad (14)$$

Each envelope coefficient is interpreted as representing the energy content of the corresponding base data wavelet if that wavelet were transformed to the space-time domain, and differences in corresponding envelope wavelets indicate differences in noise levels associated with that wavelet in the two data sets A and B, once the data sets A and B are transformed to equalize their signal parts. Therefore, for each corresponding data point A(x,t) and B(x,t), if $E_A(x) > E_B(x)$ then wavelet coefficient $c_B(x)$ is retained as an output and if $E_B(x) > E_A(x)$ then wavelet coefficient $c_A(x)$ is retained as an output. When the output wavelet coefficients are transformed back to the domain of distance and time, the resulting data has reduced noise.

In one embodiment, a third set of wavelet coefficients may be formed by selecting the wavelet coefficient corresponding to the lowest energy representative of each corresponding pair of wavelet coefficients:

$$c_C(x) = \begin{cases} c_A(x) \text{ if } E_A(x) < E_B(x) \\ c_B(x) \text{ otherwise} \end{cases} \quad (15)$$

The third set of wavelet coefficients may be transformed back to the domain of distance and time to form a data set with reduced noise.

In another embodiment, each wavelet coefficient in either data set may be replaced with a value calculated from the wavelet coefficient in the other data set, transformed to the appropriate basis:

$$c_A(x) = \min\left[c_A(x), \frac{F_B c_B(x)}{F_A}\right] \quad (16)$$

$$c_B(x) = \min\left[c_B(x), \frac{F_A c_A(x)}{F_B}\right]. \quad (17)$$

If a linear combination of the coefficients from the two data sets is desired, a third data set may be constructed from the wavelet coefficients, as follows:

$$c_C(x) = L\min\left[c_A(x), \frac{F_B c_B(x)}{F_A}\right] + M\min\left[c_B(x), \frac{F_A c_A(x)}{F_B}\right] \quad (18)$$

where, as before, L and M are any linear filters, scaling factors, or weighting factors.

If desired, the coefficients L and M may be determined according to an energy minimization criterion using the envelope of wavelet coefficients. For example, a least-squares routine may be performed using L and M as parameters to combine the data sets A and B into a combined data set C, which is Hilbert transformed and then wavelet transformed. An envelope calculated from $c_C(x)$ and $c_C^H(x)$ as above may be used as the measure of energy to be minimized in the least-squares process.

Any of the operations described in connection with 206 and 208 above may be performed using a computer with a computer-readable medium bearing instructions for performing the operations described above, including comparing the energy content of corresponding data points in two data set and selecting from corresponding pairs of data points the data point having the lowest energy content to form a noise reduced data set.

At 210, the noise reduced data set produced by the selection at 208 is used to identify prospective geological resources, such as by depicting the noise reduced data set in a way that represents the physical environment, for example by graphical depiction on a computer screen. The depiction may then be used to identify prospects for subterranean exploration, such as drilling or excavation. If desired, an inverse wavelet transform may be performed on the noise reduced data set to form a noise-reduced version of the primary record.

Any number of data sets may be used in a selection process as described above. A binary selection process between two data sets is described above, but the method may be extended to a selection process using any number of data sets, provided the data sets are appropriately transformed to have equal signal parts. If N data sets are so employed, each corresponding data point in each data set is compared with every other corresponding data point according to the methods described above to determine the data point with the lowest noise component. As described above, every data point with a higher noise component may be replaced with a predicted value formed by applying transforming filters to the data point with the lowest noise component.

For example, if three data sets, A, B, and C, are used, with equalizing filters $F_A$, $F_B$, and $F_C$, such that $F_A A_S = F_B B_S = F_C C_S$, the wavelet transformation may be performed on each data set, and the equalizing filters applied, to form wavelet coefficient sets $c_A$, $c_B$, and $c_C$. For each corresponding wavelet coefficient $c_A$, $c_B$, and $c_C$, the corresponding wavelet coefficients may be set to the lowest value among all the corresponding transformed coefficients, as follows:

$$c_A(x_1, x_2, x_3) = \min\left(c_A(x_1, x_2, x_3), \frac{F_B c_B(x_1, x_2, x_3)}{F_A}, \frac{F_C c_C(x_1, x_2, x_3)}{F_A}\right) \quad (19)$$

$$c_B(x_1, x_2, x_3) = \min\left(c_B(x_1, x_2, x_3), \frac{F_A c_A(x_1, x_2, x_3)}{F_B}, \frac{F_C c_C(x_1, x_2, x_3)}{F_B}\right) \quad (20)$$

$$c_C(x_1, x_2, x_3) = \min\left(c_C(x_1, x_2, x_3), \frac{F_A c_A(x_1, x_2, x_3)}{F_C}, \frac{F_B c_B(x_1, x_2, x_3)}{F_C}\right) \quad (21)$$

An iterative binary selection process may also be performed between successive pairs of the coefficient sets to select an output set. Alternately, a resultant wavelet coefficient set $c_R$ may be constructed from the three wavelet coefficient sets $c_A$, $c_B$, and $c_C$, as follows:

$$c_R(x) = L\min\left[c_A(x), \frac{F_B c_B(x)}{F_A}, \frac{F_C c_C(x)}{F_A}\right] + \\ M\min\left[c_B(x), \frac{F_A c_A(x)}{F_B}, \frac{F_C c_C(x)}{F_B}\right] + \\ O\min\left[c_C(x), \frac{F_A c_A(x)}{F_C}, \frac{F_B c_B(x)}{F_C}\right] \quad (22)$$

In this way, the methods described above may be extended to any desired number of data sets by an iterative binary process or by a collective process.

The iterative binary selection process is generally performed by processing corresponding data points at each location of the domain. In the frequency domain, a first location of the frequency domain is identified, and a coefficient is accessed from each data set being subjected to the binary selection process. The coefficients are compared according to any of the methods described herein, and an output coefficient is retained in an output data set that has the same domain as the data sets from which the coefficients are accessed. A second location of the frequency domain is then identified and the process repeated. The binary selection process is complete when the comparison has been performed at all desired locations of the frequency domain.

The wavelet coefficient sets thus obtained may be used to decompose the resulting data according to frequency, wavenumber, or any other parameter associated with the particular wavelets employed for the transform. The wavelet coefficient sets may also be transformed to the physical, space-time domain for analysis.

If desired, a noise model can be constructed from the two, three, or N data sets by determining the difference between corresponding data points in the various data sets. If the data sets are transformed such that they have equal signal parts, then any differences between the data points are excess noise. In the instance of two data sets A and B, with the equalizing filters $F_A$ and $F_B$, the following quantities are noise:

$$A_N \sim A - \frac{F_B B}{F_A} \quad (23)$$

$$B_N \sim B - \frac{F_A A}{F_B} \quad (24)$$

A noise model of the form $$C_N = L\left(A - \frac{F_B B}{F_A}\right) + M\left(B - \frac{F_A A}{F_B}\right)$$

may be used to reduce noise in the combined data C=LA+MB by any convenient method, for example by adaptive subtraction and/or least-squares error reduction.

EXAMPLE

What follows is an example set of equations that may be used with the methods described herein to reduce noise in a data set. In the following description, P denotes the recorded pressure wavefield, $V_z$ denotes the recorded vertical component of the particle velocity field, and P-UP denotes the up-going part of the recorded pressure wavefield.

P-UP generation from hydrophone and geophone recordings is demonstrated. The filters $F_A$ and $F_B$ used in cross-ghosting, i.e. equalizing pressure and particle velocity signals, are given by:

$$F_A = -\frac{k_z}{\omega \rho}(1 + e^{-ik_z 2z_r}) \text{ and}$$

$$F_B = 1 - e^{-ik_z 2z_r}$$

The filters M and N for pressure de-ghosting are given by $$M=1 \text{ and } N=-\omega \rho k_z \quad (26)$$

That results in either using P and Vz for wavefield separation or replacing Vz by P converted to Vz, and replacing P by Vz converted to P. At hydrophone and geophone notch frequencies, the corresponding complementary sensor may be used.

When this method is combined with a "signal preservation term" as used in the optimized LFC, it is a natural extension of the optimized LFC to account for temporally and spatially non-stationary noise. This aspect is related to U.S. Pat. No. 7,957,906, which is hereby incorporated by reference in its entirety.

In accordance with an embodiment of the invention, a geophysical data product indicative of certain properties of the subsurface rock may be produced from the detected energy. The geophysical data product may include processed geophysical data and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the data product.

While the foregoing is directed to embodiments of the invention, other and further embodiments of the invention may be devised without departing from the basic scope thereof.

What is claimed is:

1. A method comprising:
    obtaining a first primary record of a wavefield from a first receiver, wherein the first primary record includes a first noise portion and a first signal portion;
    obtaining a second primary record of the wavefield from a second receiver, wherein the second primary record includes a second noise portion and a second signal portion, and wherein the first signal portion and the second signal portion are unequal;
    transforming the first primary record to a first transformed record and the second primary record to a second transformed record, wherein prior to the transforming, the first primary record and the second primary record have been processed to remove coherent noise, wherein the transforming substantially equalizes respective signal portions of the first transformed record and the second transformed record, and wherein a difference between the first transformed record and the second transformed record is at least partially attributable to incoherent noise in measurement of the wavefield;
    comparing an energy content of each first data point of the first transformed record with an energy content of a corresponding second data point of the second transformed record;
    selecting from each pair of corresponding first and second data points the data point that has the lowest energy content to form a noise reduced data set that reduces incoherent noise in measurement of the wavefield; and
    determining the presence of prospective geological resources using the noise reduced data set.

2. The method of claim 1, wherein the first receiver and the second receiver record different aspects of the wavefield.

3. The method of claim 1, wherein the first receiver measures pressure and the second receiver measures particle velocity.

4. The method of claim 1, wherein the first receiver is a hydrophone and the second receiver is a geophone.

5. The method of claim 2, further comprising performing a wavelet transform on the first primary record and the second primary record.

6. The method of claim 5, wherein each of the first transformed record and the second transformed record is a wavelet coefficient set.

7. The method of claim 6, further comprising performing an inverse wavelet transform on the noise reduced data set.

8. The method of claim 1, wherein the first receiver is a hydrophone, the second receiver is a geophone, and the first transformed record and the second transformed record are obtained by equalizing pressure and particle velocity signals.

9. The method of claim 8, wherein frequency notches in the first transformed record are reduced by applying data from the second transformed record, and frequency notches in the second transformed record are reduced by applying data from the first transformed record.

10. The method of claim 1, further comprising using the noise reduced data set to produce a geophysical data product indicative of certain properties of subsurface rock.

11. A non-transitory computer-readable medium that stores instructions, wherein the instructions are executable by one or more processors to:
retrieve a first primary record of a wavefield recorded by a first receiver, wherein the first primary record includes a first noise portion and a first signal portion;
retrieve a second primary record of the wavefield recorded by a second receiver, wherein the second primary record includes a second noise portion and a second signal portion, and wherein the first signal portion and the second signal portion are unequal;
transform the first primary record to a first transformed record and the second primary record to a second transformed record, wherein prior to transformation, the first primary record and the second primary record have been processed to remove coherent noise, wherein the transform substantially equalizes respective signal portions of the first transformed record and the second transformed record, and wherein a difference between the first transformed record and the second transformed record is at least partially attributable to incoherent noise in measurement of the wavefield;
compare an energy content of each first data point of the first transformed record with an energy content of a corresponding second data point of the second transformed record;
select from each pair of corresponding first and second data points the data point that has the lowest energy content to form a noise reduced data set that reduces incoherent noise in measurement of the wavefield; and
determine the presence of prospective geological resources using the noise reduced data set.

12. The non-transitory computer-readable medium of claim 11, wherein the first primary record and the second primary record represent different aspects of the wavefield.

13. The non-transitory computer-readable medium of claim 11, wherein the first primary record indicates pressure data and the second primary record indicates particle velocity data.

14. The non-transitory computer-readable medium of claim 11, wherein the first receiver is a hydrophone and the second receiver is a geophone.

15. The non-transitory computer-readable medium of claim 12, wherein the instructions are further executable to perform a wavelet transform on the first primary record and the second primary record.

16. The non-transitory computer-readable medium of claim 15, wherein each of the first transformed record and the second transformed record is a wavelet coefficient set.

17. The non-transitory computer-readable medium of claim 16, wherein the instructions are further executable to perform an inverse wavelet transform on the noise reduced data set.

18. The non-transitory computer-readable medium of claim 11, wherein the first receiver is a hydrophone, the second receiver is a geophone, and the first transformed record and the second transformed record are obtained by equalizing pressure and particle velocity signals.

19. The non-transitory computer-readable medium of claim 18, wherein the instructions are further executable to:
reduce frequency notches in the first transformed record by applying data from the second transformed record; and
reduce frequency notches in the second transformed record by applying data from the first transformed record.

20. The non-transitory computer-readable medium of claim 11, wherein the instructions are further executable to use the noise reduced data set to produce a geophysical data product indicative of certain properties of subsurface rock.

21. A method of manufacturing a geophysical data product, comprising:
performing, by one or more computers, operations comprising:
obtaining a first primary record of a wavefield from a first receiver, wherein the first primary record includes a first noise portion and a first signal portion;
obtaining a second primary record of the wavefield from a second receiver, wherein the second primary record includes a second noise portion and a second signal portion, and wherein the first signal portion and the second signal portion are unequal;
transforming the first primary record to a first transformed record and the second primary record to a second transformed record, wherein prior to the transforming, the first primary record and the second primary record have been processed to remove coherent noise, wherein the transforming substantially equalizes respective signal portions of the first transformed record and the second transformed record, and wherein a difference between the first transformed record and the second transformed record is at least partially attributable to incoherent noise in measurement of the wavefield;
comparing an energy content of each first data point of the first transformed record with an energy content of a corresponding second data point of the second transformed record;
selecting from each pair of corresponding first and second data points the data point that has the lowest energy content to form a noise reduced data set that reduces incoherent noise in measurement of the wavefield;
based on the noise reduced data set, storing geophysical data on a tangible computer-readable medium; and
determining the presence of prospective geological resources using the geophysical data.

22. The method of claim 21, wherein the first receiver and the second receiver record different aspects of the wavefield.

23. The method of claim 21, wherein the first receiver measures pressure and the second receiver measures particle velocity.

24. The method of claim 21, wherein the first receiver is a hydrophone and the second receiver is a geophone.

25. The method of claim 22, further comprising performing a wavelet transform on the first primary record and the second primary record.

26. The method of claim 25, wherein each of the first transformed record and the second transformed record is a wavelet coefficient set.

27. The method of claim 26, further comprising performing an inverse wavelet transform on the noise reduced data set.

28. The method of claim 21, wherein the first receiver is a hydrophone, the second receiver is a geophone, and the first transformed record and the second transformed record are obtained by equalizing pressure and particle velocity signals.

29. The method of claim 28, wherein frequency notches in the first transformed record are reduced by applying data from the second transformed record, and frequency notches in the second transformed record are reduced by applying data from the first transformed record.

\* \* \* \* \*